(12) United States Patent
Rhee et al.

(10) Patent No.: US 8,566,733 B2
(45) Date of Patent: Oct. 22, 2013

(54) APPARATUS AND METHOD FOR CONTENT MANAGEMENT OF A PORTABLE DEVICE

(75) Inventors: Young-ho Rhee, Seoul (KR); Jae-hwan Kim, Suwon-si (KR); Jung-hun Kim, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 11/831,487

(22) Filed: Jul. 31, 2007

(65) Prior Publication Data

US 2008/0100941 A1    May 1, 2008

(30) Foreign Application Priority Data

Oct. 27, 2006 (KR) ............................... 2006-105332

(51) Int. Cl.
  *G06F 3/0481* (2013.01)
(52) U.S. Cl.
  USPC ............... 715/764; 715/765; 725/39; 725/62; 360/13
(58) Field of Classification Search
  USPC ............ 715/764, 765; 455/456.1; 725/39, 62; 360/13
  See application file for complete search history.

(56) References Cited

U.S. PATENT DOCUMENTS

| | | | | |
|---|---|---|---|---|
| 5,760,767 A * | 6/1998 | Shore et al. | ................... | 715/723 |
| 5,781,188 A * | 7/1998 | Amiot et al. | .................. | 715/723 |
| 5,781,687 A * | 7/1998 | Parks | .............................. | 386/281 |
| 5,936,625 A * | 8/1999 | Kahl et al. | ..................... | 715/775 |
| 5,999,173 A * | 12/1999 | Ubillos | .......................... | 715/724 |
| 6,072,479 A * | 6/2000 | Ogawa | .................................. | 1/1 |
| 6,952,221 B1 * | 10/2005 | Holtz et al. | ................... | 715/723 |
| 7,109,848 B2 * | 9/2006 | Schybergson | ............. | 340/309.7 |
| 7,260,419 B2 * | 8/2007 | Lee | ................................. | 455/566 |
| 7,430,595 B2 * | 9/2008 | Morita et al. | ................. | 709/223 |
| 7,486,872 B2 * | 2/2009 | Noguchi et al. | ............. | 386/278 |
| 7,600,245 B2 * | 10/2009 | Steading et al. | ................ | 725/52 |
| 8,060,364 B2 * | 11/2011 | Bachar et al. | ................. | 704/231 |
| 2002/0010759 A1 * | 1/2002 | Hitson et al. | ................... | 709/219 |
| 2002/0068558 A1 * | 6/2002 | Janik | ............................. | 455/422 |
| 2002/0198006 A1 * | 12/2002 | Hirayama et al. | ............ | 455/456 |
| 2003/0103088 A1 * | 6/2003 | Dresti et al. | .................. | 345/835 |
| 2004/0070491 A1 * | 4/2004 | Huang et al. | ................. | 340/10.5 |
| 2005/0055716 A1 * | 3/2005 | Louie et al. | ..................... | 725/58 |
| 2006/0253874 A1 * | 11/2006 | Stark et al. | ....................... | 725/62 |

FOREIGN PATENT DOCUMENTS

| | | |
|---|---|---|
| KR | 2004-24382 | 3/2004 |
| KR | 2005-18084 | 2/2005 |
| KR | 2005-46450 | 5/2005 |

\* cited by examiner

*Primary Examiner* — Phenuel Salomon
(74) *Attorney, Agent, or Firm* — NSIP Law

(57) ABSTRACT

A content-management apparatus of a portable device. The apparatus includes a display unit to display content by time and function in a content area having a time axis and a function axis, and a content generation unit to combine at least two sets of content.

16 Claims, 5 Drawing Sheets

IMAGE + MESSAGE

SOUND + IMAGE

BIO RHYTHM + MESSAGE

APPARATUS AND METHOD FOR CONTENT MANAGEMENT OF A PORTABLE DEVICE

CROSS-REFERENCE TO RELATED APPLICATIONS

This application claims the benefit of Korean Patent Application No. 2006-105332 filed in the Korean Intellectual Property Office on Oct. 27, 2006, the disclosure of which is incorporated herein by reference.

BACKGROUND OF THE INVENTION

1. Field of the Invention

Aspects of the present invention relate to a content management apparatus and method. More particularly, aspects of the present invention relate to a content management apparatus and method of a portable device that selects at least two sets of content in a content management screen centering on a time axis and a function axis and divided into at least two parts, displays edited or combined content in a preview form as content set by a user in different areas, and provides the content to the portable device of the user or another user.

2. Description of the Related Art

Along with the development of communication technologies, portable devices, especially mobile communication devices, have become smaller and lighter, and are now widespread. Since portable devices are now widespread, the needs of consumers have become diverse. Mobile communication devices are used not only for calling, but also for storing pictures and videos taken by a user, and for viewing downloaded content or content produced by the user.

When content stored in a mobile communication device and predetermined content generated by a camera is edited, a predetermined editing program on a personal computer needs to be used. Predetermined content stored in the mobile communication device is transmitted to a personal computer, is edited as the user wants, and is then retransmitted to the mobile-communication device, or is transmitted to a mobile communication device of another user.

FIG. 1 illustrates a content management apparatus according to the conventional art. The content management apparatus according to the conventional art is an apparatus for managing content in a portable device. The portable device for managing content includes an input unit 110, a speaker 120, a display unit 130, a camera 140, a storage unit 150, and a control unit 160.

As illustrated in FIG. 1, the input unit 110 includes a plurality of number keys and function-selection keys. A user inputs a predetermined command using the keys. When a predetermined function is performed by the predetermined command input through the input unit 110, the speaker 120 and the display unit 130 outputs the result of performing the command using audio or text. The storage unit 150 stores images captured by the camera. A multimedia message writing program allows the user to edit images to write multimedia message content and to transmit the produced content.

If the user wants to produce multimedia-message content, a producing window is provided through the display unit 130 so that the user can produce the multimedia message content by selecting content stored in the storage unit 150. Multimedia message content produced through the producing window is stored as video files or used as background pictures. The control unit 160 controls the whole system in such a manner that multimedia message content produced according to the request of the user is transmitted to the portable device of another user.

If a call occurs while in the multimedia message writing mode, the control unit 160 stores the images being edited and converts the writing mode to the calling mode. When the call is terminated, the control unit 160 restores the system to the multimedia message writing mode.

According to Korean Unexamined Patent 10-2003-0056039 (Portable device with Multimedia-Message-Content Writing and Transmitting Function), a predetermined program for producing multimedia messages needs to be provided, but because the process of managing and editing multimedia content in the producing content is complicated, the usability is low, which is a problem.

SUMMARY OF THE INVENTION

Aspects of the present invention provide a content management apparatus and method of a portable device that selects at least two sets of content in a content-management screen centering on a time axis and a function axis divided into at least two parts, displays edited or combined content in a preview form as content set by a user in different areas, and provides the content to the portable device of the user or another user.

According to an aspect of the present invention, a content-management apparatus of a portable device is provided. The apparatus includes a display unit to display content by time and function in a content area having a time axis and a function axis, and a content generation unit to combine at least two sets of content.

According to an aspect of the present invention, a content-management method of a portable device is provided. The method includes displaying content by times and functions in a content area having a time axis and a function axis, and combining at least two sets of content.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
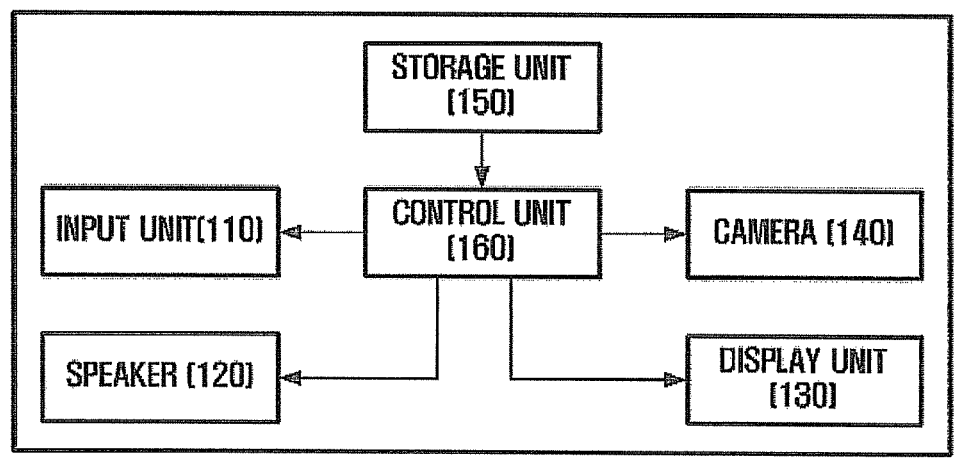
FIG. 1 illustrates a content-management apparatus according to the conventional art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
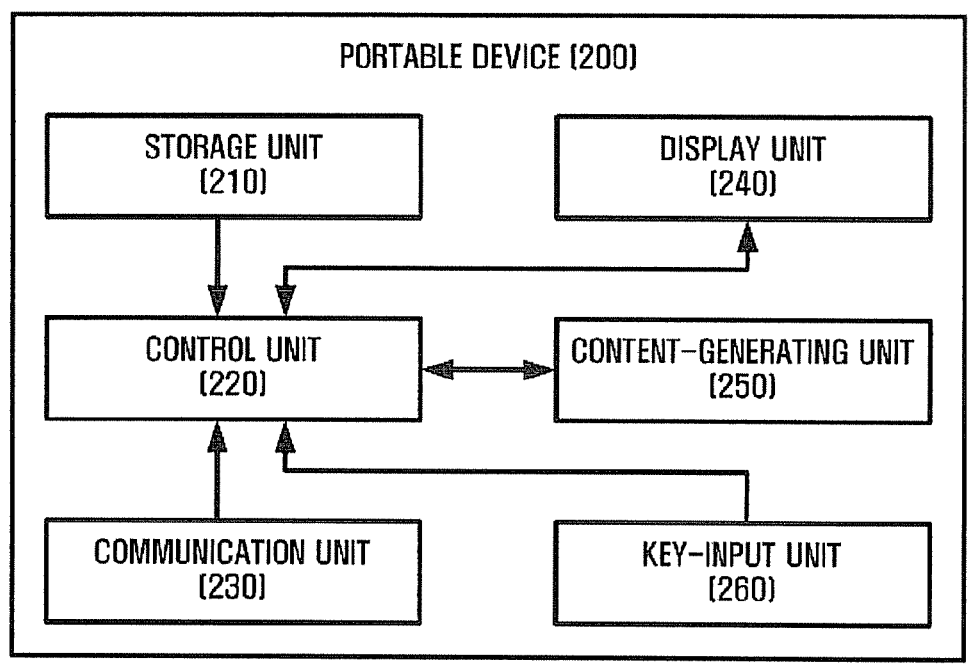
FIG. 2 illustrates a content-management apparatus of a portable device according to an embodiment of the present invention.

FIG. 2 illustrates a content management apparatus of a portable device 200 according to an exemplary embodiment of the present invention. The content management apparatus of the portable device 200 edits and composes predetermined content stored in a general mobile communication device or received from other devices, stores the generated content, and/or transmits the content to another user. The portable device 200 includes a storage unit 210, a control unit 220, a communication unit 230, a display unit 240, a content generation unit 250, and a key input unit 260. The portable device according to other aspects of the invention may include different units; similarly, one or more of the above units may be combined into a single component.

The storage unit 210 stores predetermined content provided by a predetermined content server (not shown), predetermined content generated in the portable device 200 of a user, and an editing program for editing and combining stored content. Predetermined content stored in the storage unit 210 may include images, videos, text messages, multimedia messages, memos, schedules, and biorhythms. Text messages refers to sending and receiving text messages of a user. Memos refer to voice or text memos. Other types of content may be stored in the storage unit 210 as well.

The content is displayed through the content area based on the time axis and the function axis using the editing program, is generated as new content through the editing and combination according to the user's setting, and is then stored or provided to another user. Content stored in the storage unit 210 may include not only the above-mentioned content, but also the content edited and combined by the user. The storage unit 210 may use a flash memory, which allows easy storage and deletion. However, the storage unit 210 according to other aspects of the invention may be any type of storage medium, such as a magnetic storage medium.

When the user requests the display of content, the control unit 220 executes an editing program stored in the storage unit 210 so as to display the content on the display unit 240. When the editing and combination of a predetermined content displayed in the display unit 240 is requested, the content is provided to the content generation unit 250 so as to allow the user to generate new content. New content generated in the content generation unit 250 is provided to another device, or is stored in the storage unit 210. The control unit 220 performs an overall control for the content management of the portable device 200.

The communication unit 230 may include a first communication unit (not shown) for connection with other portable devices and a second communication unit (not shown) for performing communication functions, such as wireless Internet. The first communication unit may be at least one of USB, IEEE 1394, RS-232, PS2, a parallel port, and Bluetooth, and the second communication unit may be at least one of communication interfaces that can use communication methods such as PLC and WiBro. As used herein, "at least one of" refers to any combination of one or more items. Thus, for example, the first communication unit may be any combination of one or more of USB, IEEE 1394, RS-232, PS-2, parallel port, or Bluetooth. The user may be provided predetermined content from another portable device or content server through such a communication unit 230. The user may transmit content generated in the portable device 200 to another user's portable device through the communication unit 230.

The display unit 240 displays, through the editing program stored in the storage unit 210, a content area, a menu area, and an editing area that together show predetermined content stored in the storage unit 210 based on the time axis and the function axis. The menu area indicates at least one of the time axis-change button, the date-change menu, and the retrieval menu for retrieving objects that are the basis of generated content. The content area indicates content corresponding to the time axis and the function axis from predetermined content stored in the storage unit 210, and indicates predetermined content according to the menu selection of the user.

If at least two sets of content are selected, generated content is displayed as a preview by combining the content through the editing area. The content may be edited and combined in the editing area according to the user's settings. The editing area may be divided into an area where at least two sets of content selected by the user in the content area are combined, and a replay area where the combined content is outputted. The content management screen displayed in the display unit 240 will be described later in detail with reference to FIG. 3.

The content-generation unit 250 generates new content by editing and combining at least two sets of content selected in the content area of the display unit 240. Content generation using the content-generation unit 250 is performed according to the user's settings and/or commands. The combination can be performed by mixing at least two sets of content from images, videos, text messages, multimedia messages, memos, schedules and biorhythms, or content that can be derived from such content. For example, the composition method may be at least one of a method of combining an image and sound, a method of combining an image and a message, a method of combining multiple images, a method of combining sound and a schedule, and a method of combining a video and sound.

The key input unit 260 may include multiple number keys and/or predetermined function-selection keys. The user selects content indicated in the content area and inputs a predetermined command for combination using the key input unit 260. The key input unit 260 according to other aspects of the invention may be a numeric keypad, an alphanumeric keypad, a touchpad, a mouse, a microphone, or other device capable of receiving input from the user.

Figure 3:
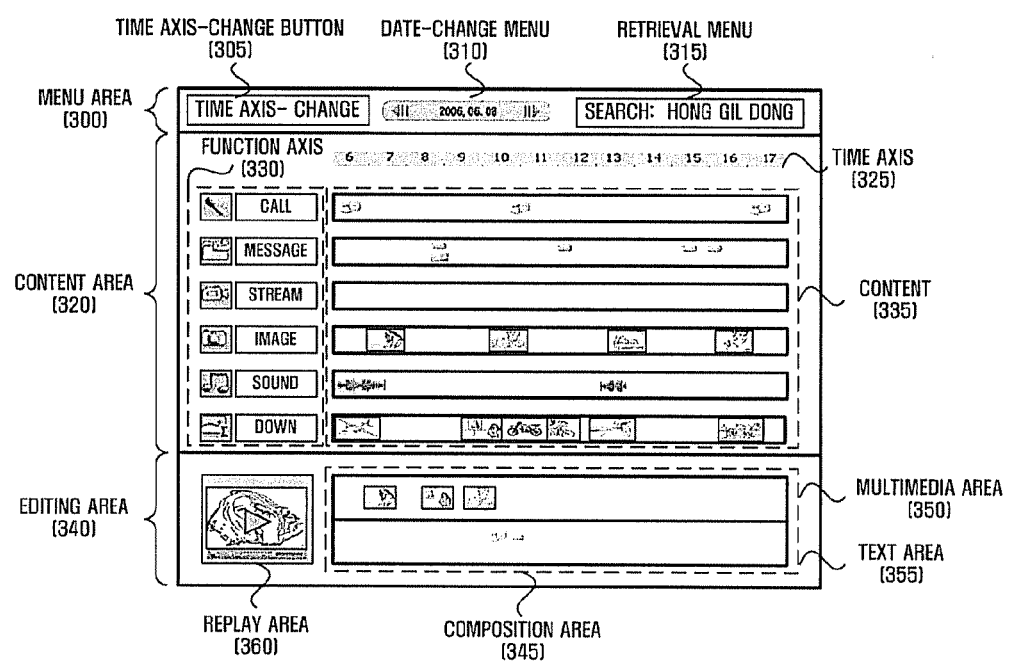
FIG. 3 illustrates a content-management screen according to an embodiment of the present invention.

FIG. 3 illustrates a content management screen according to an embodiment of the present invention. The content management screen of the portable device 200 displays predetermined content stored in the storage unit 210 based on the time axis and the function axis, and selects at least two sets of content from predetermined displayed sets of content. The selected sets of content are combined as new content by the user's settings. The new content is then stored in the storage unit 210 or is transmitted to the portable device 200.

The content management screen, as shown in FIG. 3, includes a menu area 300, a content area 320, and an editing area 340. The menu area 300 includes a time axis-change button 305, a date-change menu 310 and a retrieval menu 315. Predetermined content corresponding to the time axis 325 and the function axis 330 is displayed in the content area 320. The user edits or combines at least two sets of content selected from the predetermined sets of content 335 through the editing area 340.

The editing area 340 is combined in the composition area 345 depending on the type of content. The composition area 345 includes a multimedia area 350, a text area 355, and a replay area 360 that replays content combined in each area as a preview form. The elements of the content management screen are not limited to the above-mentioned elements. The content management screen may include additional elements or elements derived from the above-mentioned elements.

The user may change the display method of content 335 displayed in the content area 320 using a predetermined menu of the menu area 300. For example, the display method by the time axis-change button 320 of the menu area 300 selects at least one preset time range of the time axis. If the preset time range has divided 24 hours of one day by 12-hour ranges, predetermined content generated in the portable device 200 is displayed. The displayed content may be different in size depending on the set time range.

The display method corresponding to the date-change menu 315 displays the sending, reception, download, and predetermined content generated in the portable device 200. The date may be displayed as a calendar for easy selection by the user.

The content display through the retrieval menu 315 retrieves the object that is the basis for generating predetermined content stored in the storage unit 210, and displays the corresponding content. A search term may be, for example, the name or the phone number of the sender or the receiver. The content area 320 displays predetermined content 335 corresponding to the menu selection of the menu area 300, and predetermined content corresponding to the time axis 325 and the function axis 330.

For example, when 24 hours are divided by time ranges (12 hours) of predetermined intervals, one time range of two preset time ranges is displayed in the time axis 325. The time axis 325 is changed by the time axis-change button 305. The function axis 330 corresponds to the content stored in the storage unit 210. The predetermined content 335 is stored in the storage unit 210 so as to correspond to one of the functions of the portable device 200. For example, if the portable device includes functions for calling, sending a message, downloading content (such as videos, images, and sounds), storing content, and replaying content, the predetermined content is stored in the storage unit 210 and displayed based on the corresponding function. Thus, content corresponding to a calling function (e.g., a recording of a call) is displayed so as to correspond to the calling function. The predetermined content 335 displayed in the content area 320 corresponds to the time axis 325 and the function axis 330.

The user selects at least two sets of content from the displayed content 335 and generates new content centered on the user. The area where the new content is generated is the editing area 340. The editing area 340 includes the composition area 345 and the replay area 360.

The composition area 345 can be divided into a multimedia area 350 and a text area 355 depending on the type of content selected by the user. At least two sets of content selected by the user are edited in the composition area 345 in the desired form to be combined as one set of content.

The combination in the composition area 345 can be at least one of a method of combining an image and sound, a method of combining an image and a message, a method of combining multiple images, a method of combining sound and a schedule, a method of combining a video and sound, and other methods derived from the methods. New content can be generated by combining first content (not shown) generated by combining at least two sets of content in the multimedia area 350, and second content (not shown) generated in the text area 355. The content generated in the composition area 345 can be displayed as a preview form through the replay area 360, and can be stored in the storage unit 210 or transmitted to another user's portable device depending on the user's setting.

Figure 4:
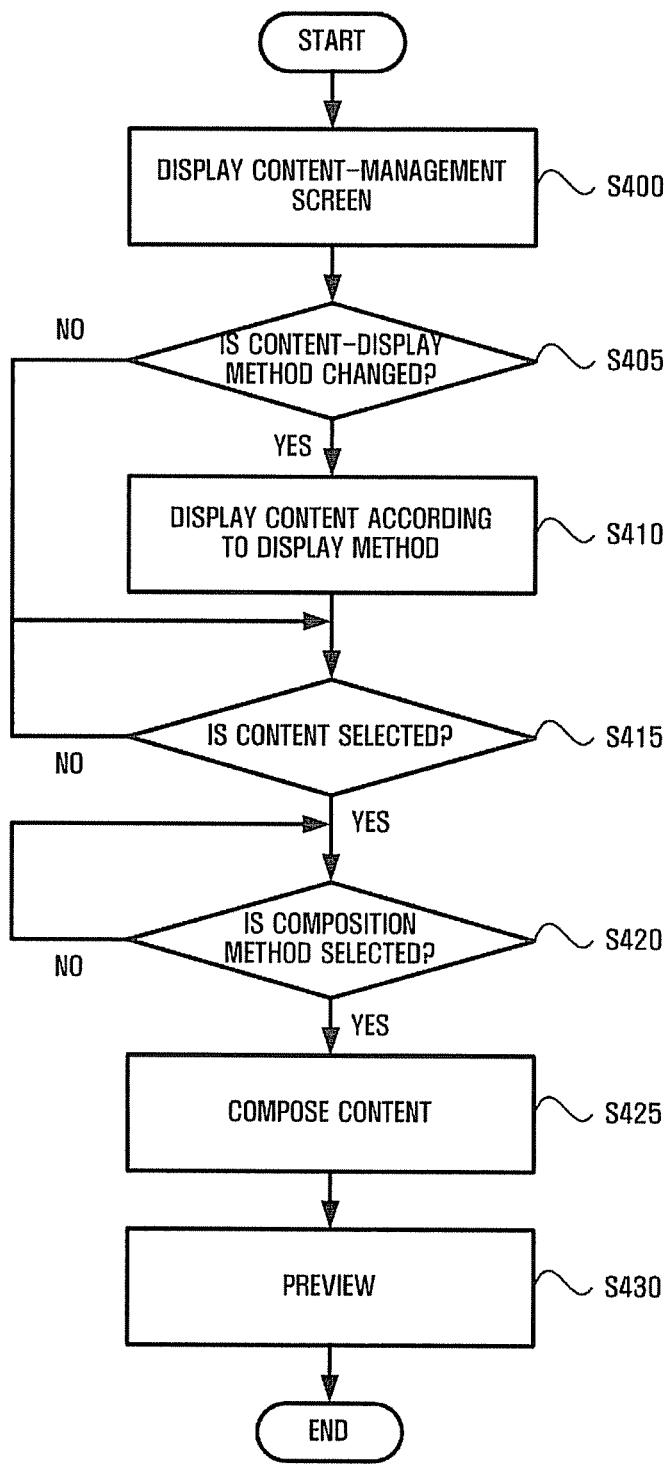
FIG. 4 is a flowchart illustrating the content management of a portable device according to an embodiment of the present invention.

FIG. 4 is a flowchart illustrating content management of the portable device 200 according to an exemplary embodiment of the present invention. The content management of the portable device 200 displays predetermined content 335 stored in the storage unit 210 through the content area 320 based on the time axis 325 and the function axis 330, and composes the content as the user-defined content.

The user executes the editing program using the predetermined function-selection key in the key-input unit 260, and displays the content management screen in operation S400. The content management screen displayed through the display unit 240 of the portable device 200 includes the menu area 300, the content area 320, and the editing area 340. The predetermined content stored in the storage unit 210 is displayed in the content area 320.

The user sets the display method on the predetermined content 335 displayed through the content area of the content-management screen in operation S405. The content-display method in the content area 320 corresponds to at least one menu of the time axis-change button 305 of the menu area 300, the date-change menu 310, and the retrieval menu 315. The predetermined content 335 is displayed in the content area 320 at operation S410.

For example, the display method by the time axis-change button 305 of the menu area 300 selects at least one preset time range of the time axis. If the preset time range has divided 24 hours of one day by 12-hour ranges, predetermined content generated in the portable device 200 is displayed. The displayed content can be different in size depending on the set time range.

The display method corresponding to the date-change menu 310 displays the sending, reception, download, and predetermined content generated in the portable device 200. The content display through the retrieval menu 315 retrieves the object that is the basis for generating predetermined content stored in the storage unit 210, and displays content corresponding to the retrieval. A search term can be, for example, the name or the phone number of the sender or the receiver.

If the content is displayed in a predetermined way according to the selection of the user in operation S410, at least two sets of content are selected from the predetermined content displayed in the content area 320 for generation of new content in operation S415. The content selected by the user is at least two sets of content from content changed through each menu, which can be the content of the same date or the content of the same (or different) date and a different time axis.

If at least two sets of content are selected by the user in operation S415, the content is displayed in the composition area 345. The user edits and composes the content using the composition area 345, and the content is displayed in the multimedia area 350 or the content area 320 depending on the type of the content.

The user selects a method for combining content displayed in each area at operation S420. The combining can be performed by mixing at least two sets of content among images, videos, text messages, multimedia messages, memos, schedules and biorhythms, or content that can be derived from such content. For example, the composition method can be at least one of a method of combining an image and sound, a method of combining an image and a message, a method of combining multiple images, a method of combining sound and a schedule, and a method of combining a video and sound. In operation S425, the content is combined according to the selected composition method.

The content combined in such a method is displayed as a preview through the replay area 360 at operation S430. The combined content may be replayed on the content management screen, is displayed as a background screen of the portable device 200, or is transmitted to the portable device of another user.

Figure 5:
FIG. 5 illustrates content combination according to an embodiment of the present invention.
Figure 5:
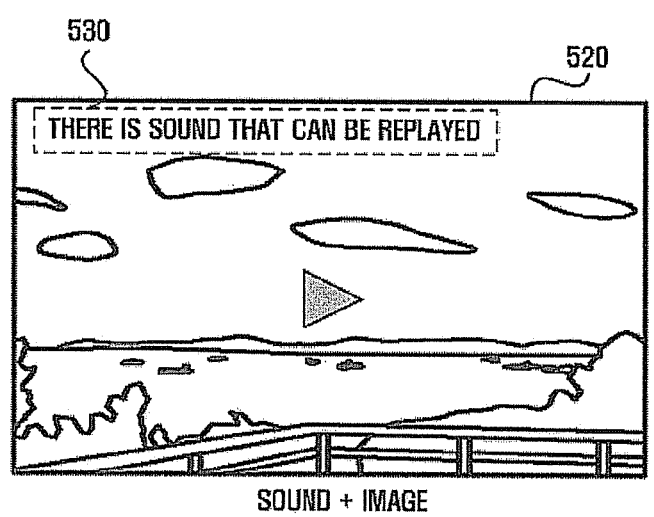
Figure 5:
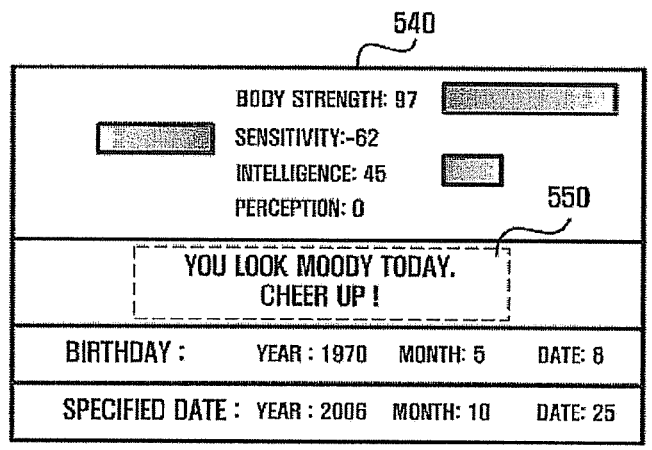

FIG. 5 illustrates combination of content according to an embodiment of the present invention. The combination of content generates new content according to the composition method by the user's setting. The content generated through the combining is stored in the portable device 200 of the user, or is transmitted to another user's portable device.

The content generated according to the composition method by the user's setting can be content generated by the combination of an image 500 and a message 510, content generated by the combination of an image 520 and sound 530, and/or content generated by the combination of biorhythms 540 and a message 550. Such a combination is achieved by using at least two sets of content from content stored in the storage unit 210, such as images, videos, pictures, text messages, multimedia messages, memos, schedules and biorhythms. The composition method can be at least one of a method of combining an image and sound, a method of combining an image and a message, a method of combining multiple images, a method of combining sound and a schedule, a method of combining a video and sound, or other methods derived from the above methods.

The content can be combined by editing generated content according to the user's setting. In order to combine content according to the user's setting, predetermined content selected by the user can be at least two sets of content existing on the same date, or can be content generated on the same (or different) date, but displayed on different time axes 325.

At least two sets of content are selected and combined from content displayed through a predetermined menu of the menu area 300. The content generated by the combination can be transmitted to other users in using any transmission technique, such as email, SMS, etc.

The method and apparatus according to aspects of the present invention has several advantages. First, predetermined content can be displayed at one time based on the time axis and the function axis. Second, the user-centered content can be generated by combining at least two sets of content from predetermined content displayed at one time. Third, the combined content can be transmitted to the portable device of another user.

Content generation techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). The computer readable recording medium can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A content management apparatus of a portable device, the apparatus comprising:
    a display unit configured to display representations of content by time and function in a content area having a time axis displaying one preset time range from a group of one or more preset time ranges and a function axis representing content according to a corresponding function;
    a content selection component configured to create, within a composition area displayed by the display unit, a representation of content selected from the content area by a user; and
    a content generation unit configured to generate new content by combining at least two sets of content whose representations are displayed concurrently in the composition area at the time the sets of content are combined, wherein:
    the content and composition areas are simultaneously displayed in separate portions of the display unit at the time the sets of content are combined,
    the content generation unit generates the new content by combining an image and a sound, combining an image and a message, combining multiple images, combining a sound and a schedule, or combining a video and a sound, and
    each of two representations of content is displayed along the time axis according to a different time associated with the respective content and displayed along the function axis according to a different function associated with the respective content.

2. The apparatus of claim 1, wherein the display unit displays at least one of a time axis-change button that changes the time of the time axis, a date-change menu that changes the date of the time axis, or a retrieval menu that retrieves an object that is the basis for generating the new content.

3. The apparatus of claim 2, wherein the time axis-change button sets the time range of the displayed time axis as one of a plurality of preset time ranges.

4. The apparatus of claim 1, wherein:
    the display unit displays a replay area in which the new content is outputted.

5. The apparatus of claim 4, further comprising:
    a communication unit to communicate with another device and to transmit the new content to the other device.

6. The apparatus of claim 1, wherein the content includes at least one of images, videos, text messages, multimedia messages, memos, schedules, or biorhythms.

7. The apparatus of claim 1 further comprising:
    a reproduction component configured to present the new content by reproducing and presenting concurrently the two media items composing the new content in a replay area of the display unit, wherein
    the content, composition, and replay areas are simultaneously displayed in separate portions of the display unit at the time the new content is replayed in the replay area.

8. The apparatus of claim 1, wherein the content generation unit generates the new content in accordance with a combining method selected by a user.

9. The apparatus of claim 1, wherein the content generation unit generates the new content by combining an image and a sound, combining a sound and a schedule, or combining a video and a sound.

10. A content management method of a portable device implemented by an image processing apparatus comprising a processor having computing device-executable instructions, the method comprising:
- displaying representations of content by time and function in a content area having a time axis displaying one preset time range from a group of one or more preset time ranges and a function axis representing content according to a corresponding function;
- creating, within a composition area, a representation of content selected from the content area by a user; and
- generating new content by combining at least two sets of content whose representations are displayed concurrently in the composition area at the time the sets of content are combined, wherein:
- the content and composition areas are simultaneously displayed in separate portions of a display unit at the time the sets of content are combined,
- the combining at least two sets of content includes combining an image and a sound, combining an image and a message, combining multiple images, combining a sound and a schedule, or combining a video and a sound, and
- each of two representations of content is displayed along the time axis according to a different time associated with the respective content and displayed along the function axis according to a different function associated with the respective content.

11. The method of claim 10, wherein the displaying includes at least one of changing the time of the time axis, changing the date of the time axis, or retrieving an object that is the basis for generating the new content.

12. The method of claim 11, wherein the changing of the time axis sets the time range of the displayed time axis.

13. The method of claim 10, wherein the displaying comprises:
- displaying content that is an object of the combination; and
- outputting the generated new content.

14. The method of claim 10, wherein the content includes at least one of images, videos, text messages, multimedia messages, memos, schedules, or biorhythms.

15. A content management apparatus of a portable device, the apparatus comprising:
- a display unit configured to display representations of content by time and function in a content area having a time axis displaying one preset time range from a group of one or more preset time ranges and a function axis representing content according to a corresponding function;
- a content selection component configured to create, within a composition area of the display unit, a representation of content selected from the content area by a user;
- a content generation unit configured to generate new content by combining at least two sets of content whose representations are displayed concurrently in the composition area at the time the sets of content are combined;
- a first communication unit to communicate with other portable devices; and
- a second communication unit including a communication interface to perform communication functions, wherein:
- each of two representations of content is displayed along the time axis according to a different time associated with the respective content and displayed along the function axis according to a different function associated with the respective content,
- the content and composition areas are simultaneously displayed in separate portions of the display unit at the time the sets of content are combined, and
- the content generation unit generates the new content by combining an image and a sound, combining an image and a message, combining multiple images, combining a sound and a schedule, or combining a video and a sound.

16. A content management apparatus of a portable device, the apparatus comprising:
- a display unit configured to display representations of media items according to a grid pattern presented within in a content area, the content area having a time axis and a media-format axis and the representations of media items being displayed such that media items of the same media format are displayed in the same row/column of the grid pattern and media items associated with the same time are displayed in the same column/row of the grid pattern;
- a content selection component configured to create, within a composition area of the display unit, a representation of content selected from the content area by a user;
- a content generation unit configured to generate new content by combining two media items that are concurrently represented within the composition area, wherein:
- each of two representations of media items is displayed along the time axis according to a different time associated with the respective media item and displayed along the media-format axis according to a different media format associated with the respective media item,
- the content and composition areas are simultaneously displayed in separate portions of the display unit at the time the sets of content are combined,
- the new content is generated by combining media of: an image and audio, an image and another image, audio and a representation of a schedule, or video and audio, and
- upon presentation of the new content, each of the two media items composing the new content is reproduced and presented concurrently by the portable device.

* * * * *